Patented Feb. 28, 1928.

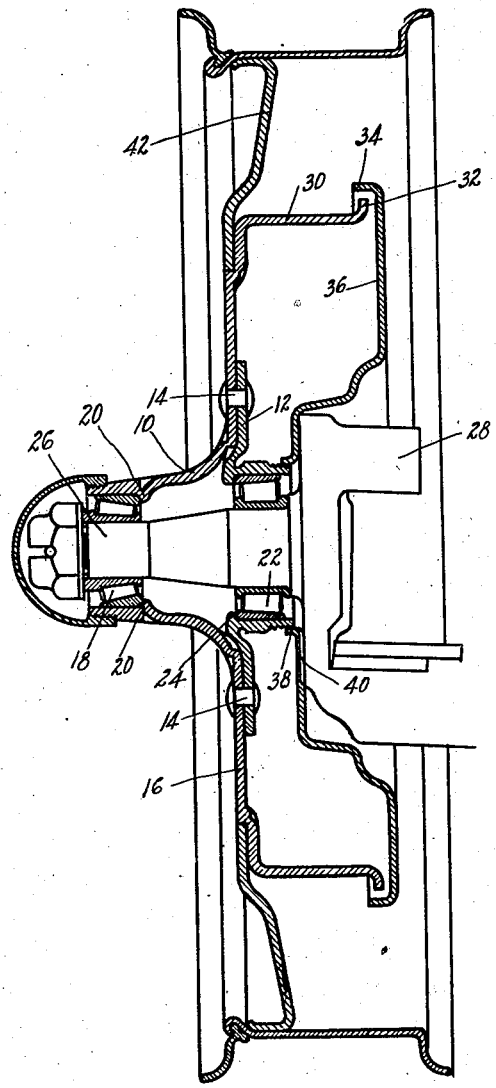

1,660,660

UNITED STATES PATENT OFFICE.

D'ORSAY McCALL WHITE, OF CHICAGO, ILLINOIS, ASSIGNOR TO MOTOR INDUSTRIES, INC., OF CHICAGO, ILLINOIS, A CORPORATION OF ILLINOIS.

PRESSED WHEEL.

Application filed September 21, 1925. Serial No. 57,602.

This invention relates to wheels, and is illustrated as embodied in a front disk wheel for an automobile. An object of the invention is to simplify the construction, and lessen the cost, of such a wheel by drawing out the center of a load-carrying disk part to form an integral and generally tubular half-hub, which cooperates with and is completed by, a separate half-hub formed of a stamping having a flange attached to the disk. Preferably the outer edge of the disk is turned inwardly as a flange which, in the illustrated wheel, serves as a brake drum. When such a drum is used, the tire and its rim may be carried by an annulus secured to the disk adjacent its outer edge.

The above and other objects and features of the invention will be apparent from the following description of one illustrative embodiment shown in the accompanying drawing, in which:

The figure is a vertical section through one front wheel, and associated parts.

The illustrated wheel comprises a pair of stampings 10 and 12, each having a tubular part forming a half-hub and a radially-extending flange. The two flanges are fastened together by means such as rivets 14, and the flange of the stamping 10 is continued as a load-carrying part or disk 16.

The half hub 10 has a cylindrical seat at its outer end for an antifriction bearing 18, which is positioned by abrupt shoulders 20 formed by punching inwardly at intervals the metal of the hub. The half hub 12 has a similar seat at its inner end for a bearing 22 positioned by an abrupt shoulder 24 rolled as a bead in the stamping. Bearings 18 and 22 support the spindle 26 of a front wheel knuckle 28 adapted to be swivelled by a kingpin or the like at the end of a front axle.

The load-carrying disk 16 is turned inwardly, i. e. in the opposite direction from the half-hub 10, at its outer edge to form a generally cylindrical flange 30 which, in the particular wheel illustrated, is intended for use as a brake drum. This drum has an outer stiffening flange 32, closely encircled by a cylindrical flange 34 on a backing plate 36 dished outwardly at its center and secured to knuckle 28 adjacent the end of the half-hub 12. Preferably the plate 36 is formed with a central flange 38, into which the end of the hub projects, and which catches any lubricant dripping from the end of the hub. The knuckle or the plate may be provided with a drain groove 40 for such lubricant.

The load-carrying disk 16 is rolled with an offset at its edge, to receive a tire and rim carrying stamped annulus 42 bolted or otherwise secured to disk 16. Disk 16 is pushed back out at intervals and machined, as shown at top and bottom of the figure, to form sharp shoulders on which the annulus 42 is piloted.

While one illustrative embodiment has been described in detail, it is not my intention to limit the scope of the invention to that particular embodiment, or otherwise than by the terms of the appended claims.

I claim:

1. A wheel comprising, in combination, a load-carrying disk drawn axially at its center to form one end of a tubular hub, and a separate part secured to the disk and having an oppositely-directed tubular part forming the other end of the hub, the two ends of the hub having each a seat for an antifriction bearing, and each formed with an abrupt bearing-position shoulder at the end of the seat next the center of the hub, the shoulder on said separate part being a bead substantially in the plane of said disk.

2. A wheel comprising, in combination, a load-carrying disk having a generally cylindrical flange projecting inwardly at its outer edge and having its central part drawn in the opposite direction as a generally tubular outwardly projecting half-hub, and a separate stamping having a flange secured to the disk and an inwardly-projecting generally tubular half-hub.

In testimony whereof I have hereunto signed my name.

D'ORSAY McCALL WHITE.